United States Patent [19]
Ackeret

[11] Patent Number: 4,763,429
[45] Date of Patent: Aug. 16, 1988

[54] DEVICE FOR THE CYCLIC REARRANGEMENT OF A PILE OF RECTANGULAR OR SQUARE SHEETS

[75] Inventor: Peter Ackeret, Kusnacht, Switzerland

[73] Assignee: Licinvest AG, Chur, Switzerland

[21] Appl. No.: 901,532

[22] PCT Filed: Nov. 12, 1985

[86] PCT No.: PCT/EP85/00617

§ 371 Date: Jul. 11, 1986

§ 102(e) Date: Jul. 11, 1986

[87] PCT Pub. No.: WO86/03031

PCT Pub. Date: May 22, 1986

[51] Int. Cl.[4] .............................................. G09F 11/30
[52] U.S. Cl. ........................................ 40/511; 40/490;
40/513; 40/122; 40/10 R
[58] Field of Search ................... 40/511, 513, 90, 509, 40/122

[56] References Cited

U.S. PATENT DOCUMENTS

| 535,635 | 3/1895 | Stone | 40/509 |
|---|---|---|---|
| 3,377,727 | 4/1968 | Weggeland | 40/511 |
| 3,783,540 | 2/1970 | Barclay | 40/511 |
| 4,057,920 | 11/1977 | Weggeland | 40/513 |
| 4,241,529 | 12/1980 | Bauer | 40/490 |
| 4,242,817 | 1/1981 | Ballard | 40/152.1 |
| 4,242,820 | 1/1981 | Ackeret | 40/490 |
| 4,259,802 | 4/1981 | Ackeret | 40/490 |
| 4,313,435 | 11/1983 | Bauer | 40/155 |
| 4,376,348 | 3/1983 | Ackeret | 40/511 |
| 4,550,516 | 11/1985 | Ackeret | 40/513 |

FOREIGN PATENT DOCUMENTS

| 0113057 | 7/1984 | European Pat. Off. . |
| 3014394 | 10/1981 | Fed. Rep. of Germany . |
| 2403207 | 4/1979 | France . |

Primary Examiner—Gene Mancene
Assistant Examiner—Wenceslao J. Contreras
Attorney, Agent, or Firm—Jeffrey H. Ingerman

[57] ABSTRACT

The invention relates to a device for the cyclic rearrangement of a pile of rectangular or square sheets, especially a pile of photographic prints, having a first and a second frame part which may be moved relative to one another and parallel to the main plane of the pile, and having means that, on movement of the frame parts backwards and forwards, remove an individual sheet at one end of the pile and add it to the other end of the pile again, these means comprising:

(a) a separating means to separate the individual sheet from the pile,
(b) a feeding means to feed sheets to the separating means,
(c) retaining means to hold the individual sheet in the first frame part and the remainder of the pile in the other frame part, and
(d) a guide means to guide the separated individual sheet for the purpose of returning it to the other end of the remainder of the pile, wherein as the feeding means there is provided a transporter (22, 404, 420) engaging the sheet to be separated at its rear edge in the direction of transport, while as the retaining means for the separated sheet there is provided at least one additional element (26/28, 32/80, 506/520, 300/306, 278, 32/288, 274).

20 Claims, 16 Drawing Sheets

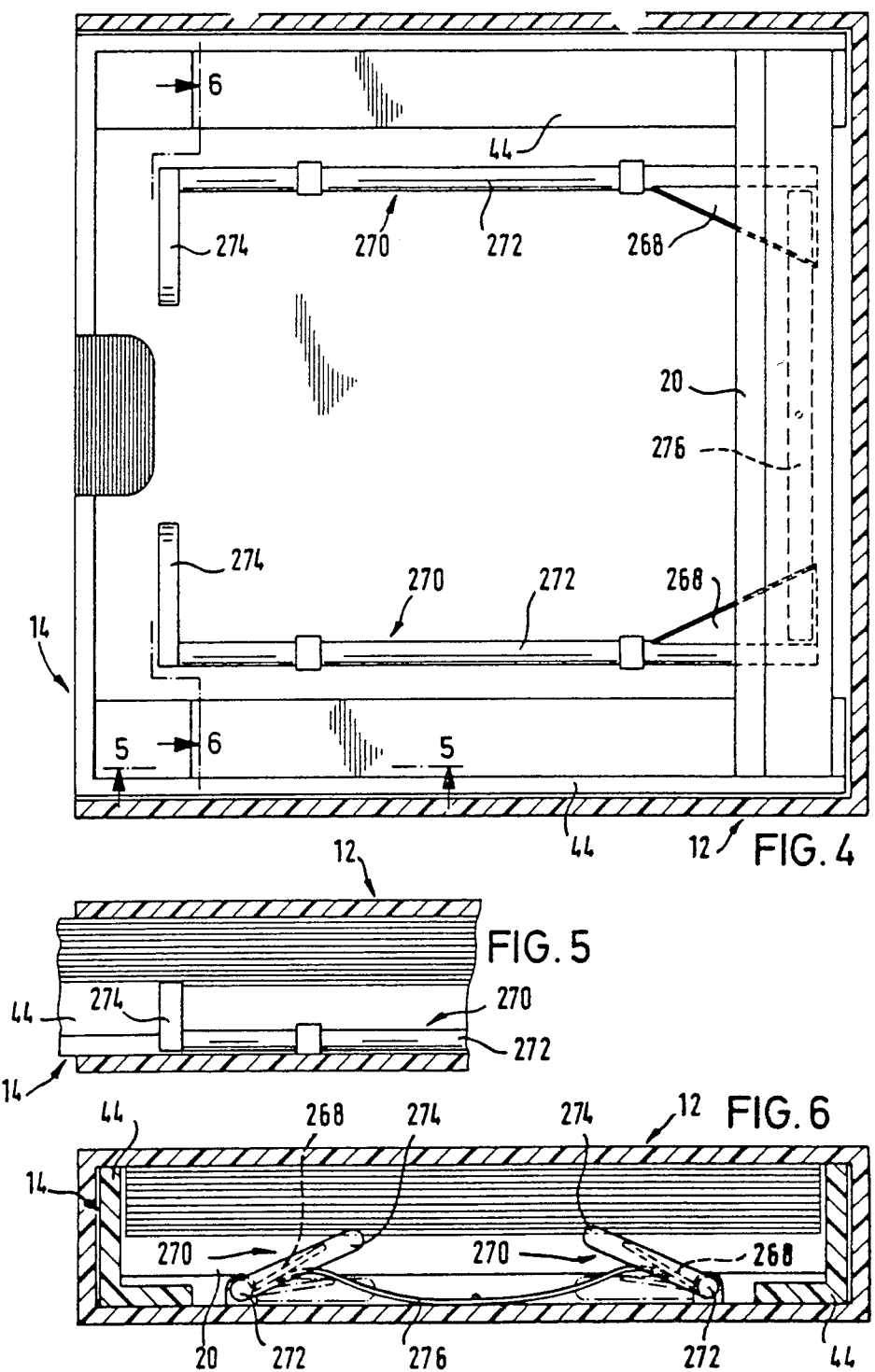

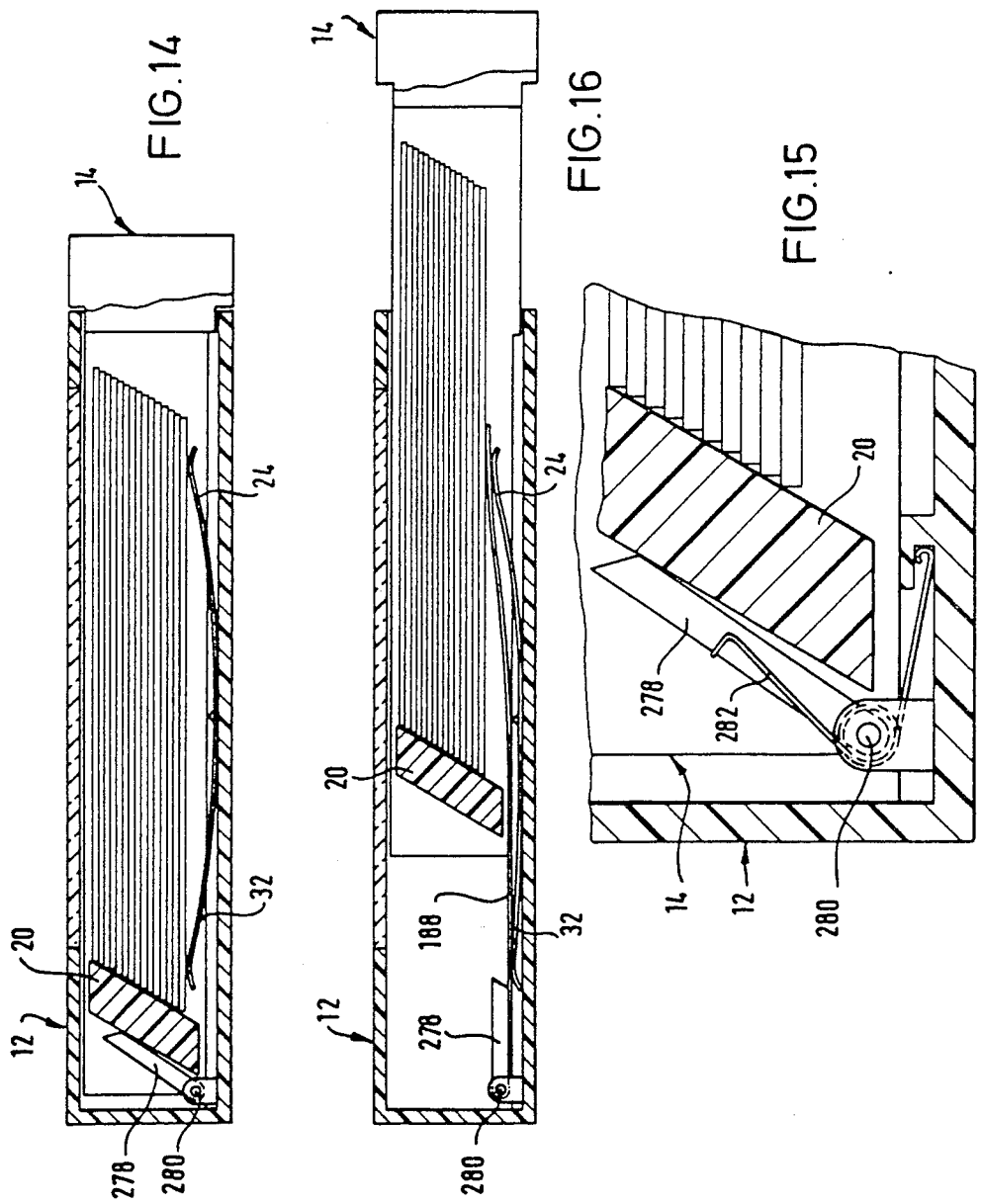

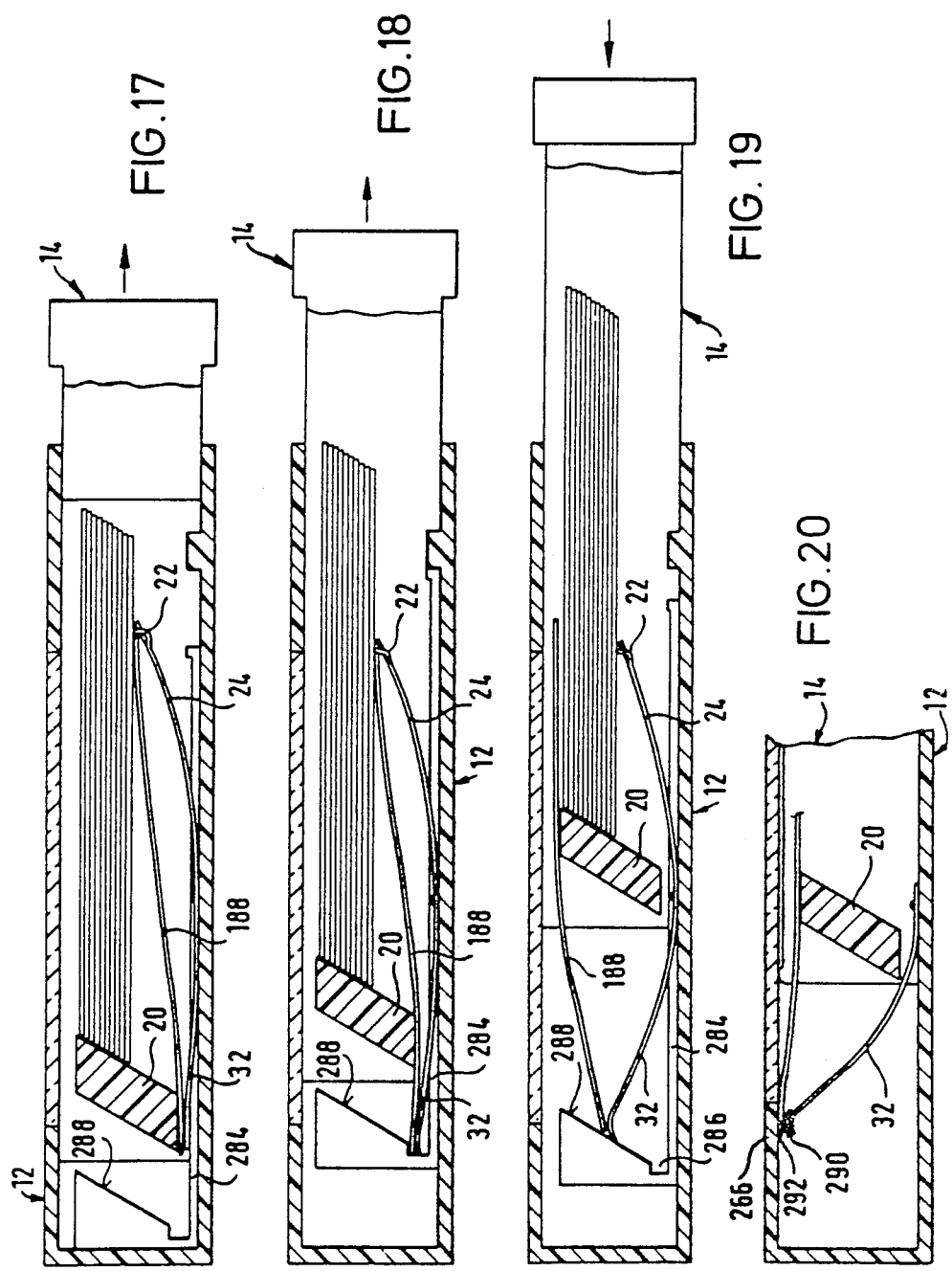

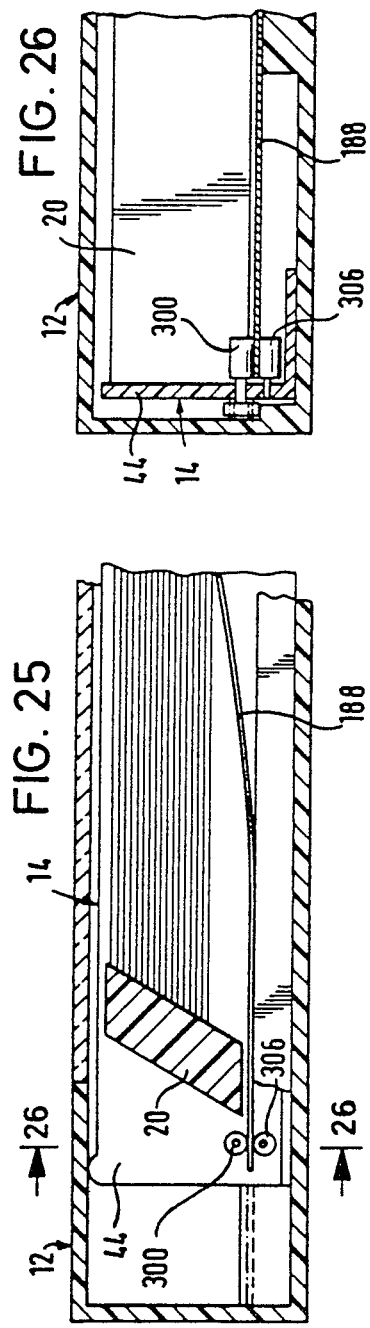
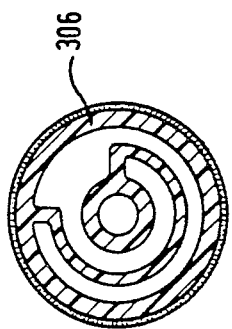

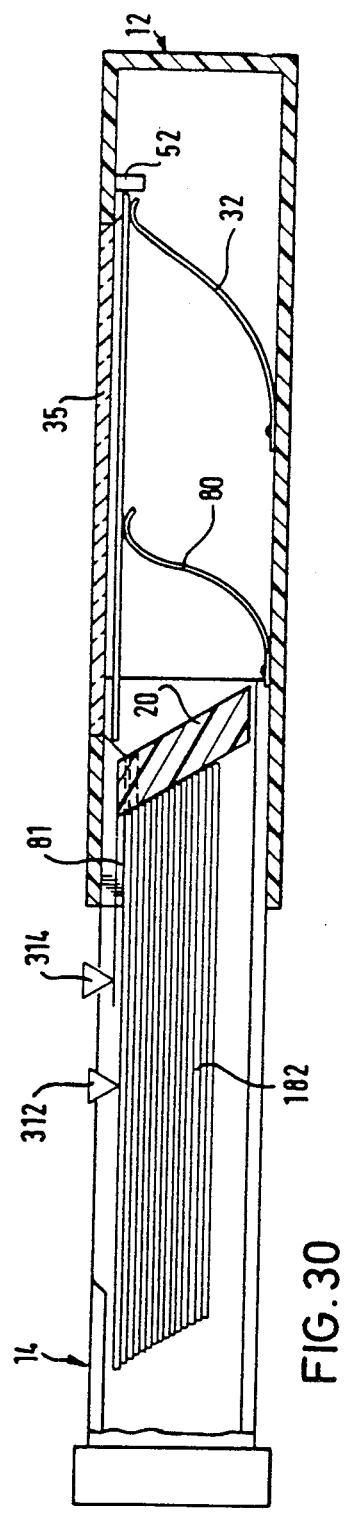

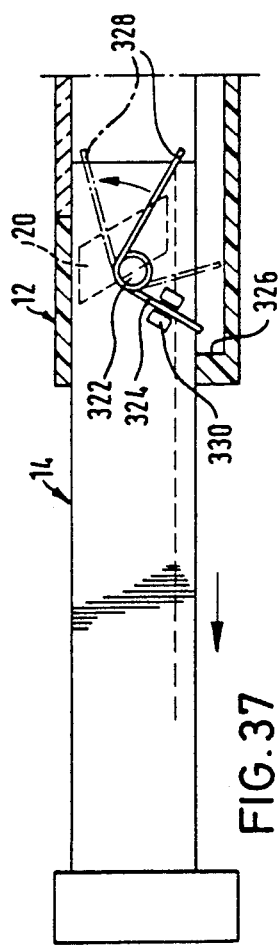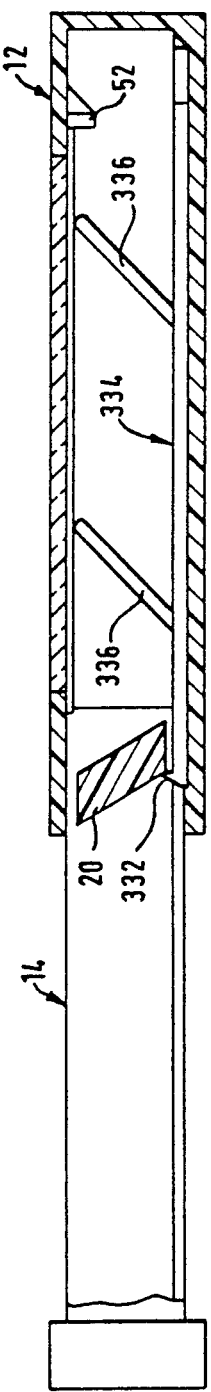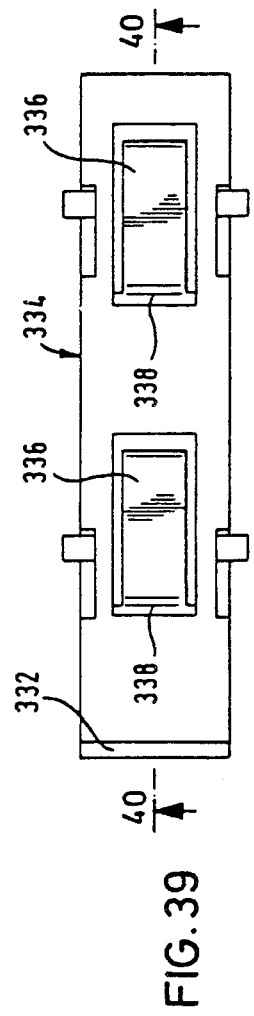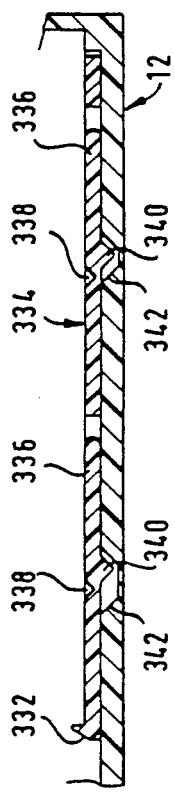
FIG. 37
FIG. 38
FIG. 39
FIG. 40

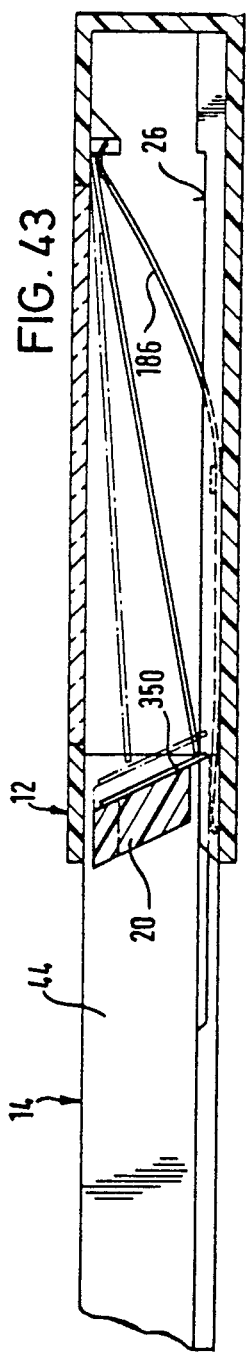
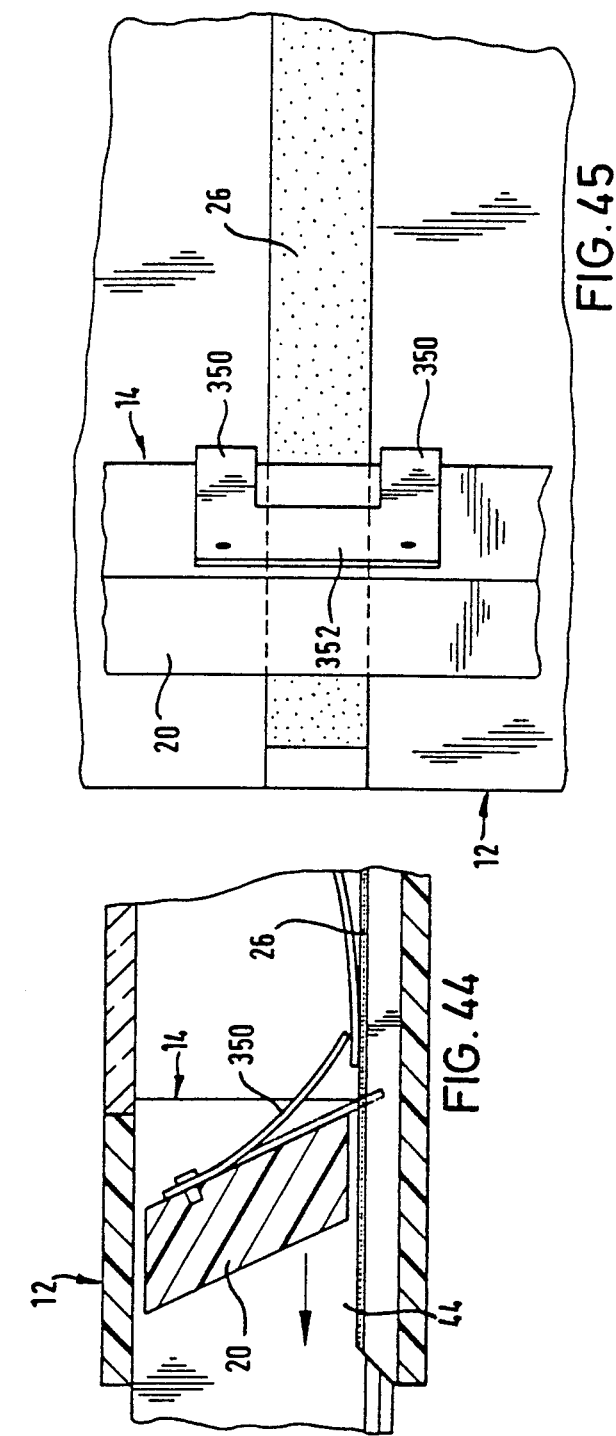

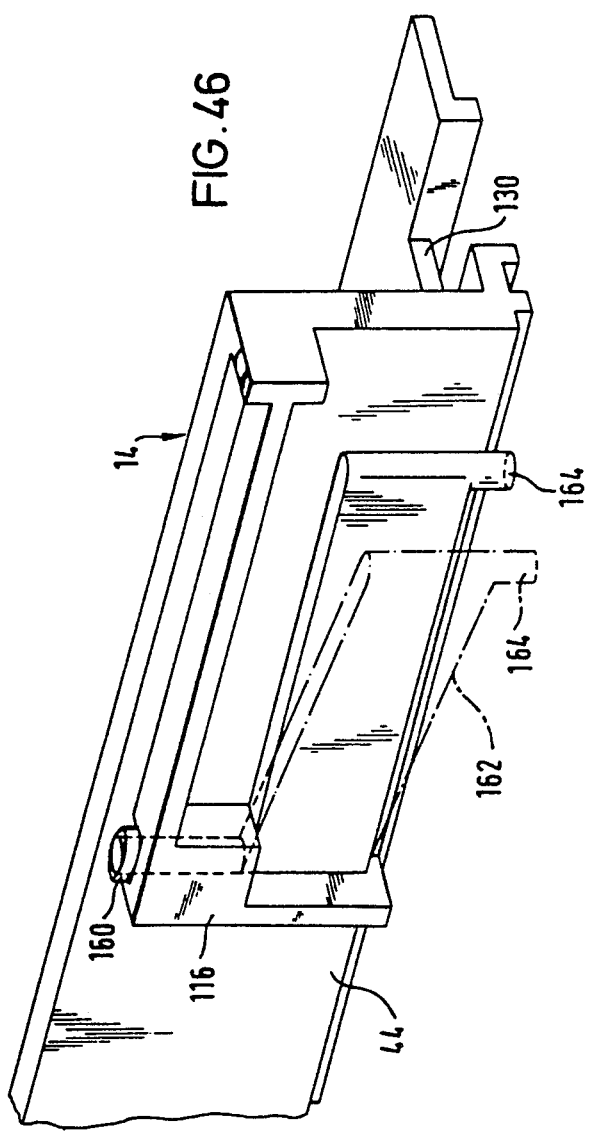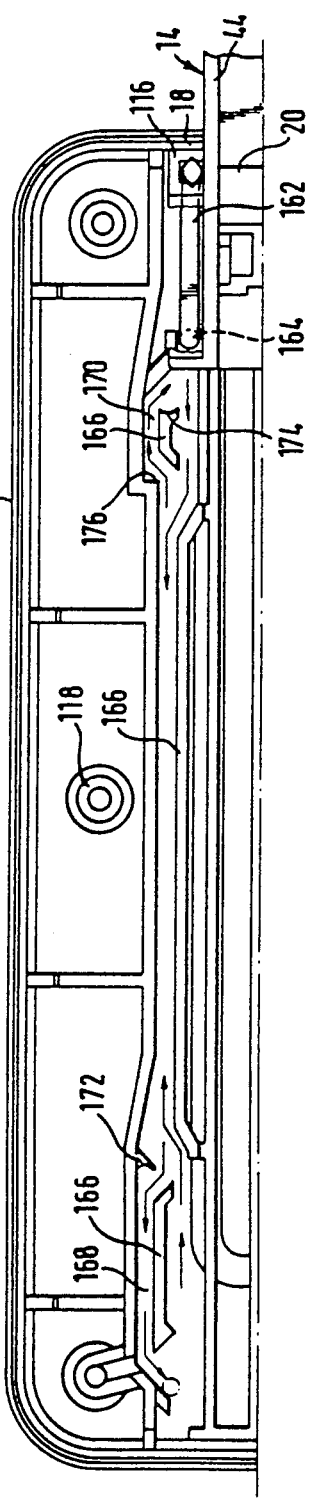

DEVICE FOR THE CYCLIC REARRANGEMENT OF A PILE OF RECTANGULAR OR SQUARE SHEETS

The invention relates to a device for the cyclic rearrangement of a pile of rectangular or square sheets, or a so-called "picture-changer".

Picture changers are known from U.S. Pat. Nos. 4,238,898, 4,238,899, 4,241,528, 4,241,529, 4,245,417, 4,259,802 and 4,376,348. These specifications are all based on the principle that a pile of pictures, especially photographic prints, is held by two frame parts that are movable relative to one another, one of which may have a viewing window. During each complete cycle of movement of the frame parts, that is, pulling them fully away from each other and sliding them fully back together again, one picture is removed from one end of the pile and returned to the other end of the pile again. The picture changers have the following components for this:

a feeding means feeds pictures to a separating means; the separating means detaches an individual picture from the pile; a retaining means holds the individual picture separated from the pile in one of the frame parts whilst the remainder of the pile is held in the other frame part; a guide means guides the separated individual picture such that it goes onto the other end of the remainder of the pile.

In the publications mentioned, the feeding and retaining means are formed by one and the same element, namely a retentive coating engaging with surface contact on the sheet to be separated. This is intended to eliminate a drawback of prior proposals, in which, as the feeding and retaining means, there was provided a hook or a ledge which engages the edge of the pile remote from the separating means. Such sheet changers may be used for relatively stiff, card-like sheets and it is possible to manufacture them inexpensively. If the sheets to be changed are photographic prints, however, which are only about 0.25 mm thick and additionally tend to cling tightly together, then a feeding means having a retentive coating engaging only with surface contact may not work effectively. A hook-form or ledge-form transporter, on the other hand, may transfer the required shearing forces, but, even if used as the retaining means also, involves the danger that the individual sheet may slide off the hook or ledge as the frame parts are pulled apart.

It is the aim of the invention to design a device of the type mentioned in the introduction that is reliable in operation and inexpensive to manufacture.

To solve this problem, there is used according to the invention a device for the cyclic rearrangement of a pile of rectangular or square sheets, especially a pile of photographic prints, which is provided with a first and a second frame part which may be moved relative to one another and parallel to the main plane of the pile, and with means that, on movement of the frame parts backwards and forwards, remove an individual sheet at one end of the pile and add it to the other end of the pile again, these means comprising:

(a) a separating means to separate the individual sheet from the pile,
(b) a feeding means to feed sheets to the separating means,
(c) retaining means to retain the individual sheet in the first frame part and the remainder of the pile in the other frame part, and
(d) a guide means to guide the separated individual sheet for the purpose of returning it to the other end of the remainder of the pile, wherein as the feeding means there is provided a transporter engaging the sheet to be separated at its rear edge in the direction of transport, whilst as the retaining means for the separated sheet there is provided at least one additional element. For the above-mentioned reasons a hook-like or ledge-like element is preferred as the transporter, which may also be combined with a retentive coating. The engagement between the transporter and the pile is preferably ensured by spring pressure, in order to accommodate different thicknesses of pile and also warping and bowing of the sheets, which occurs frequently with photographic prints.

The concept of the invention may be embodied in a wide variety of ways. In particular, retaining means of varying construction may be used and the separating means and the guide means may be modified in many respects.

A number of structural designs of the concept are illustrated in the accompanying drawings and are described in detail below.

The drawings are largely diagrammatic and are restricted to the details that are essential for each individual case or that differ from preceding drawings. As regards the overall function of a sheet-changer, reference may be made to the publications mentioned in the introduction..

FIGS. 1 to 10 show various forms of embodiment of sheet-changers in which a hook-like or ledge-like transporter is combined with different retaining means.

FIGS. 14 to 28 illustrate retaining means that are compatible with or may be combined with the transporters described above.

FIGS. 29 to 45 show details of guiding means which are compatible with or may be combined with the concept according to the invention.

FIGS. 46 and 47 finally show in partial plan view and in partial perspective, respectively, an important detail from a preferred embodiment.

The type of view, whether longitudinal section or cross-section etc., is obvious to the reader from the Figures; where this is not obvious, the type of view is specified on the Figures itself.

Figure 1:
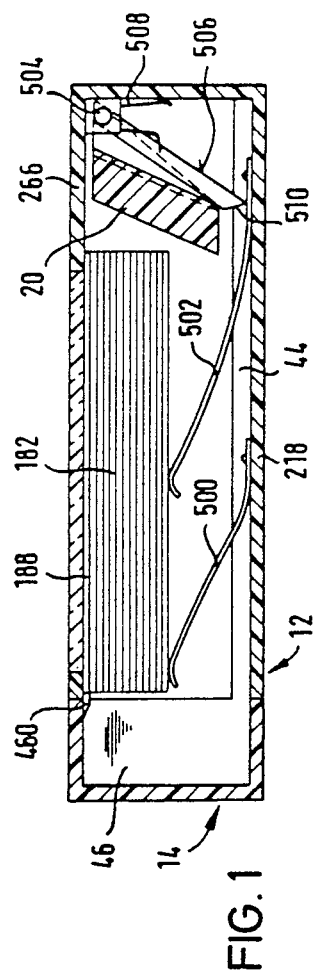
Figure 2:
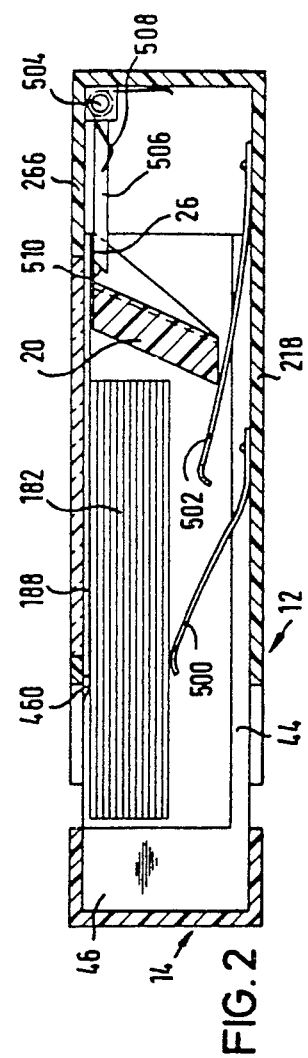
Figure 3:
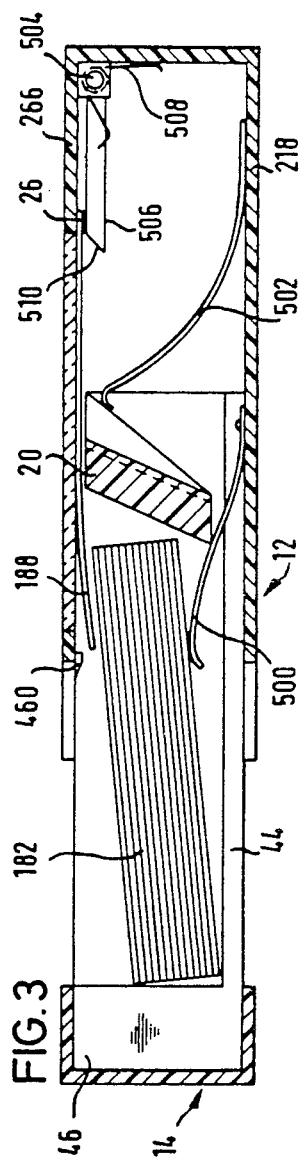

FIGS. 1 to 3 relate to one embodiment. The are largely diagrammatic and are restricted to the essential details.

The first frame part is constructed as a housing 12 and the second frame part is constructed as a slider member 14. On the top wall of the housing 12 there is arranged, for example integrally moulded, a transporter in the form of a ledge or a hook 460, and the slide pieces 44 of the slider member are joined transversely to one another at one end by the front unit 46 thereof and at the other end by a separator bar 20. To the bottom wall 218 of the housing there is secured a first pressure spring 500 which presses the end of the pile 182 nearer to the front unit 46 of the slider member against the top wall of the housing, which may have, for example, a viewing window, and a second pressure spring 502 is likewise secured to the housing floor and presses the pile upwards close to its end lying facing the separator bar.

On the side of the separator bar remote from the pile a lever 506 is hinged so that it can pivot about an axis 504, which lever is biassed by a spring 508 into the position illustrated in FIG. 2. As the slider member is inserted into the housing, the inclined face 510 at the free end of the lever 506 comes into contact with the side of the separator bar facing it and is pressed downwards by a camming action into the position illustrated in FIG. 1. The side of the lever 506 facing the top wall of the housing carries a retentive coating 26 near its free end.

The device operates as follows:

If, starting from the rest position shown in FIG. 1, the slider member 14 is pulled out of the housing 12, the transporter 460 strikes the edge, facing it, of the sheet 188 to be separated and pushes it towards the separator bar. This is possible if the pile is held against the top wall sufficiently firmly by the spring 500. As soon as the separator moves outwards, the lever 506 starts to pivot upwards under the action of its biassing spring; this takes place without interruption because the side of the separator bar facing it has a correspondingly deep passage (shown by a dashed line) in the region of the retentive coating.

As soon as the lever has reached the position shown in FIG. 2, it holds the sheet 188 firmly against the top wall of the housing; as especially apparent from FIG. 3, the transporter is not able to hold the sheet against the housing for the entire travel because the spring 500, onto which the separator bar runs, is pressed downwards so that the rear end of the pile (seen in the feed direction) becomes free. On the side of the separator bar facing the pile, the bar is also provided with wedge portions 512, the slope of which is such that when the slider member is reinserted, the ends of the springs 502 are pushed downwards and are able to slide through under the separator.

A further embodiment is shown in FIGS. 4 to 6.

FIG. 4 is a partial longitudinal section, FIG. 5 is a horizontal section, and FIG. 6 is a transverse section through the corresponding planes of the device.

The first frame part is in the form of a housing 12, and the second is in the form of a slider member 14. The separating means in the form of the separator 20 bridges the side pieces 44 of the slider member transversely. In the rest state, shown in FIG. 6, the separator presses on the wing-like actuators 268 of two links 270 which are pivotable about axes extending parallel to the withdrawal direction and indicated by 272. On the ends of the axes remote from the wing-like actuators 268 there are arms 274 which point towards each other. The links are biased by means of a leaf spring 276 in such a way that the arms 274 tend to pivot in the direction of the inserted pile of sheets.

When the slider member has travelled over a distance which is sufficient to push the individual picture through under the through gap of the separator by means of the transporter (not shown), the separator gradually releases the wing-like actuators 268 and the arms 274 come to rest from below against what is now the bottom sheet of the remainder of the pile and behind the edge of the sheet which has remained behind in the housing, so that the latter reliably remains behind in the housing while the separator transports the remainder of the pile out of the housing. The bias of the springs lifting the arms 274 may be so great that their free ends not only rest against the remainder of the pile but also raise the latter a little; thus the individual sheet cannot slide away from the arms. When the slider member is in the end position, the separator can just press the arms 274 downwards against the spring force, since it has a correspondingly inclined shape and acts like a wedge or cam. During the return travel, the remainder of the pile returns with the separator and the slider member and comes to rest on the arms. Only when the separator slides onto the wings are the arms moved over into the initial position again.

Figure 7:
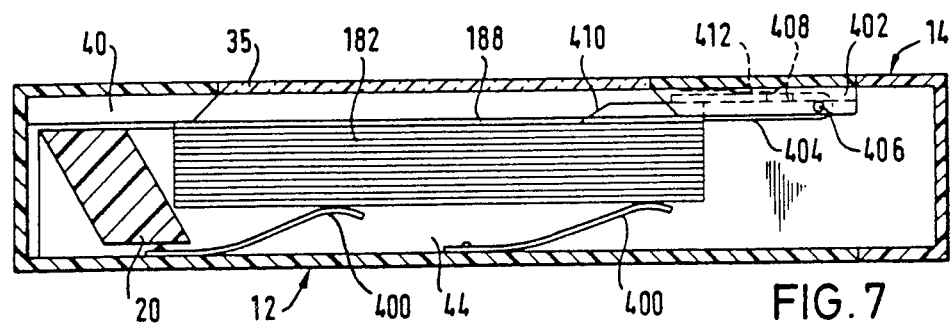
Figure 8:
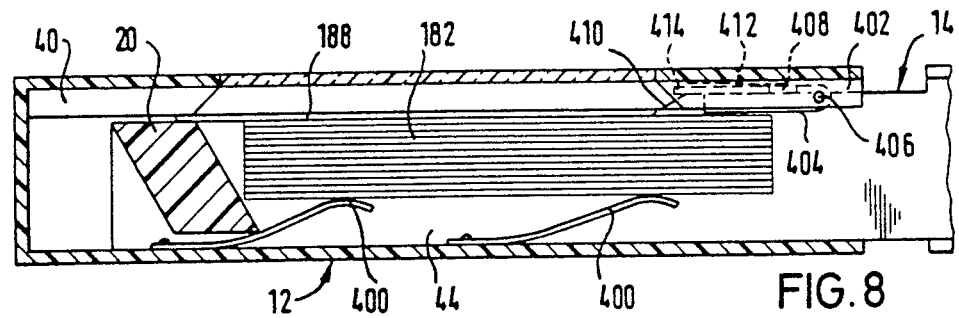
Figure 9:
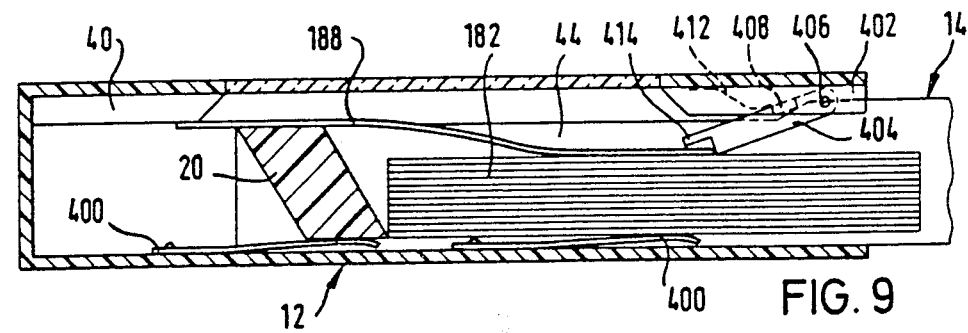
Figure 10:
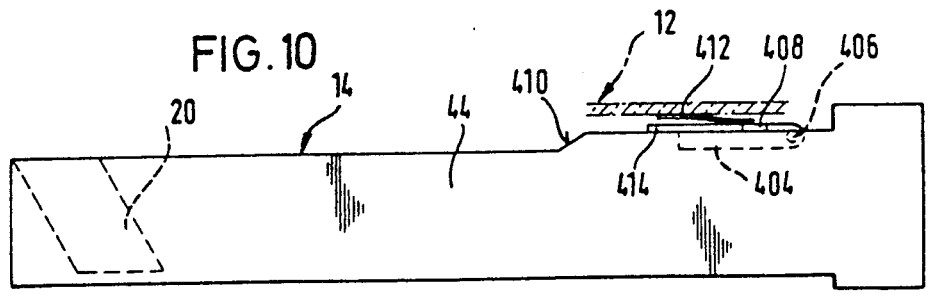

FIGS. 7 to 10 show a further embodiment. FIGS. 7 to 9 show the first phase of the change-over process in diagrammatic longitudinal section, whilst FIG. 10 is a side view of the second frame part with the transporter that is provided on the first frame part.

The first frame part is formed as a housing 12, the second as a slider member 14. The pile 182 is pressed upwards by a spring arrangement 400 so that the rear edge of the topmost sheet is supported on a rib 402, whilst its end edge comes to lie in front of the transporter 404. The actual transporter is that edge, facing the sheet, of the transporter unit, which edge projects by just a sheet thickness with respect to the rib. When the slider member is pulled, the separator 20 conveys the rest of the pile with it, whilst the individual sheet remains behind in the housing. The transporter unit 404 is hinged, so that it can pivot about an axis 406, to the housing where the latter has the rib 402, and glides with a projection 408 on the upper edge of the side piece 44 of the slider member (FIG. 10). This is designed as an actuator curve, as a result of which, after partial travel of the slider member which is adequate to push the leading edge of the individual sheet 188 through the separating means, the slope 410 allows the unit 404 to move down and thus to present a considerably deeper working face to the individual sheet than was previously possible. The unit is biassed by a leaf spring 412 and is provided with a catch projection 414 which prevents the edge of the individual sheet from sliding off in the direction of the rib 402.

Figure 11:
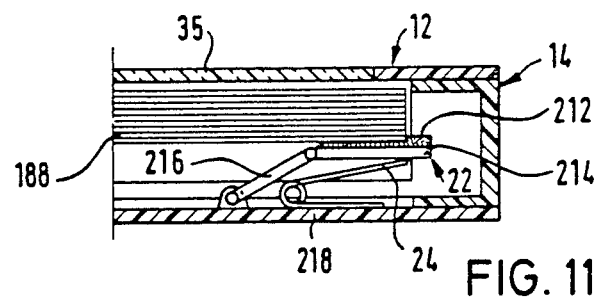
FIGS. 11 to 13 show hook or ledge transporters of modified design.
Figure 12:
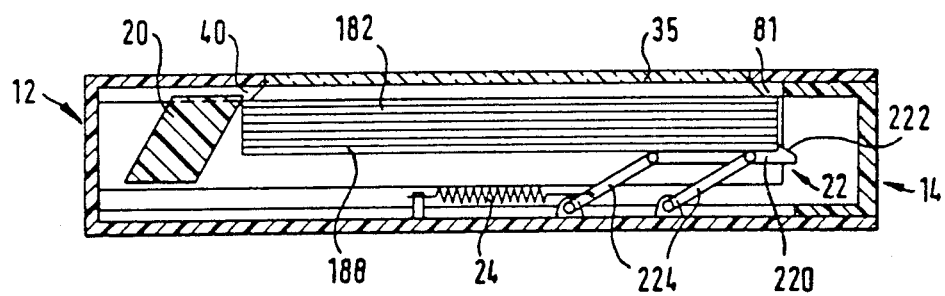
Figure 13:
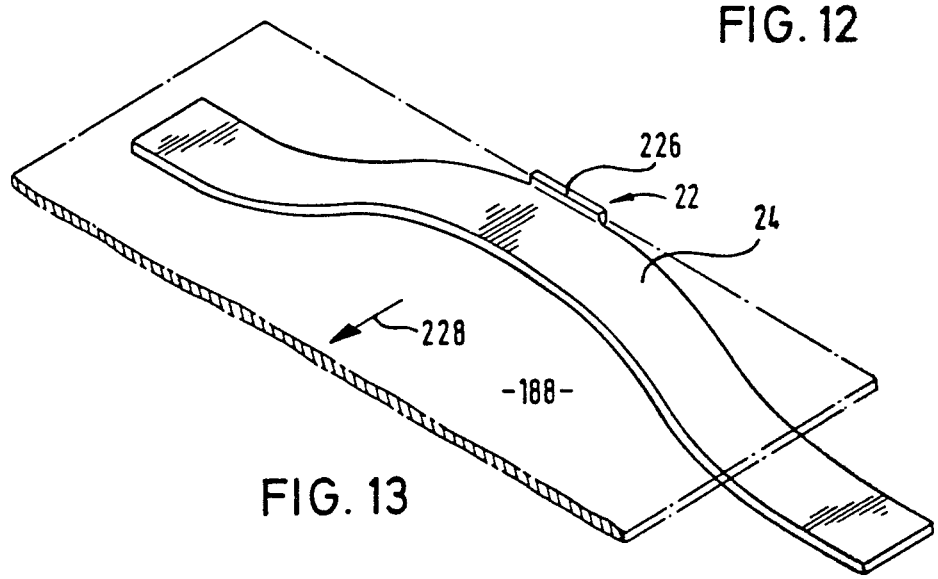

FIGS. 11, 12 and 13 finally show further arrangements of the apparatus according to the invention.

In FIG. 11 the transporter 22 comprises a compressible layer 212 on a carrier plate 21 which is connected by means of links 216 to the floor 218 of one of the frame parts. A coiled torsion spring 24 with projecting ends presses the transporter against the rear edge of the sheet 188 which is to be separated.

According to FIG. 12, the transporter 22 is in the form of a plate 220 which engages with an upwardly projecting edge 222 behind the rear edge of the sheet 188 which is to be separated. The bias arrangement comprises a helical tension spring 24 which is anchored to a fixed point and engages with a parallelogram mechanism 224 to which the transporter plate is linked. In this way the transporter is held independently of the thickness of the pile parallel to its principal plane.

According to FIG. 13, the transporter 22 is a projection 226, protruding from a leaf spring 24 which extends transversely to the direction of movement of the sheet being separated 188 symbolised by means of the arrow 228; here again, the transporter is substantially always in the same working position with respect to the edge of the sheet, independently of the number of sheets in the pile.

FIGS. 14 and 16 show in a longitudinal sectional view the rest state and the partially withdrawn state of an apparatus according to the invention in which the first frame part is formed by a housing 12 and the second by a slider member 14. A spring arrangement 24/32 and the separator bar 20 as separating means can be seen.

At the start of the withdrawal travel of the slider member, the feeding means guides the lowest sheet 188 in the housing through beneath the separator bar, behind which a pivotable jaw member 278 is arranged to rotate about a pivot 289. A spring 282 biases the jaw member 278 into the position shown in FIG. 16, as can be seen from the enlarged view according to FIG. 15. The separator bar, with the slider member pushed in, has moved the jaw member into the inactive position as a result of a camming effect when running on. The jaw member may be released automatically on withdrawal, but this is not shown in detail.

FIGS. 17, 18 and 19 show in a schematicised longitudinal section three phases of the withdrawal travel in another embodiment. The feeding of the sheet to be separated is effected by means of the transporter, namely the hook-like member 22, which is arranged on the spring arm 24. Housing, slider member and separator bar correspond to the embodiments described previously. The slider member 14 acting as the second frame part, after a certain withdrawal distance, couples itself to a member 284 which is arranged so that it can move longitudinally in the housing 12 forming the first frame part. A recess 286 is provided in the member 284 beneath a guide face 288.

As soon as the transporter, as a result of a first stroke of the slider member, has pushed the leading edge of the sheet 188 being separated through beneath the separator 20, the slider member, now coupled to the member 284, also begins to carry the latter along with it in the withdrawal direction with the result that this edge of the separated sheet goes into the recess 286 and is there firmly clamped by the arm 32 of the spring arrangement. This spring arm forms a jaw member of a pincer-like arrangement, and the edge surface of the recess situated on the other side of the clamped edge of the sheet forms the other jaw member of the pincer-like arrangement. This state persists until the rear edge of the separated sheet is freed from the separator. If the slider member is now pushed in again, it takes the member 284 back inwards with it into the housing, and the recess leaves the withdrawn sheet, so that the free arm 32 of the spring arrangement allows the edge of the sheet supported by it to slide smoothly upwards along the guide face 288.

FIG. 20 shows in an extensively schematicised partial longitudinal sectional view an embodiment in which the separator bar 20 mounted on the slider member 14, as a result of the slider member being pulled out of the housing 12, gradually releases the leaf spring 32 mounted on the latter, so that its free end, provided with a retentive coating 290, comes to rest against the edge 292 of the sheet and presses the latter against the top wall 266 of the housing, which then forms the other jaw member in conjunction with the first jaw member formed by the spring.

The pincer-like arrangements described are only some of a multiplicity of possible embodiments; thus, instead of gripping the leading edge of the sheet it would also be possible to engage on one or both sides with similar pincer-like arrangements, or the width and not the thickness of the sheet could be held between the jaw members.

Figure 21:
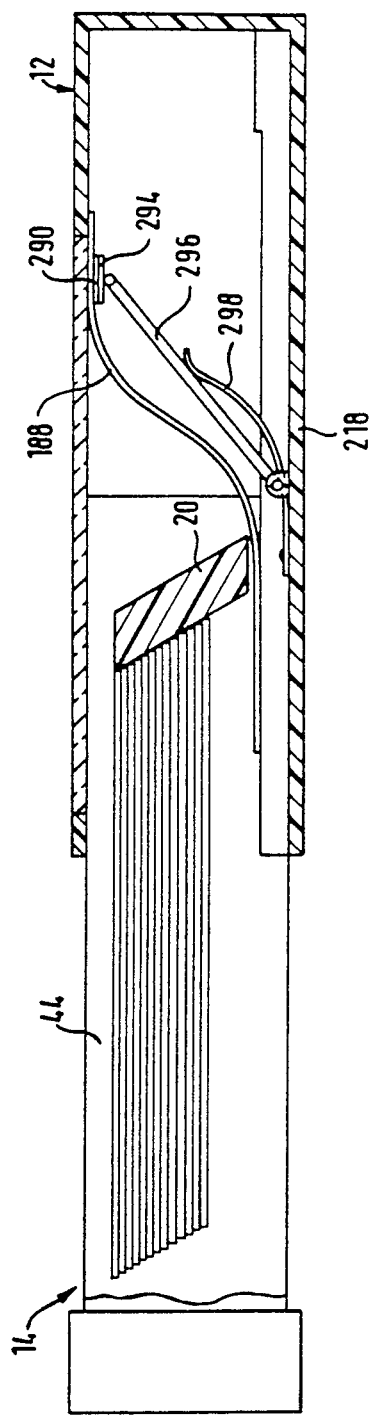

FIG. 21 shows a modification of the pincer-like arrangement according to FIG. 20: the retentive coating 290 is on a pressing arrangement, consisting of a plate 294 which carries the retentive coating and is articulated on the end of a link 296. The link is connected to the floor 218 of the housing. A spring 298 presses the retentive coating against the separated picture.

Figure 23:
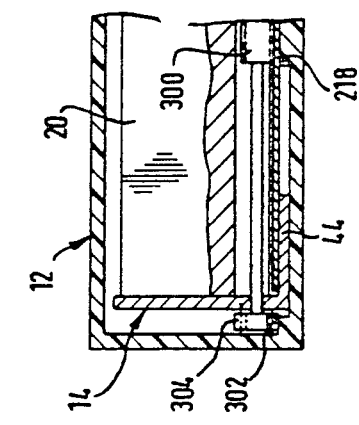
Figure 22:
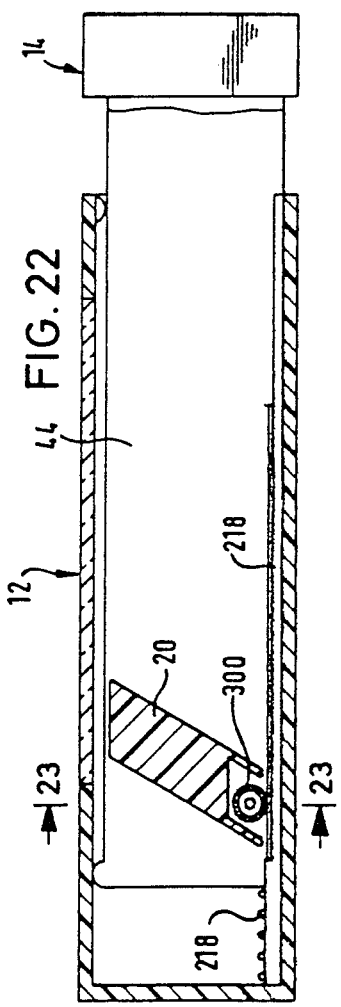
Figure 24:
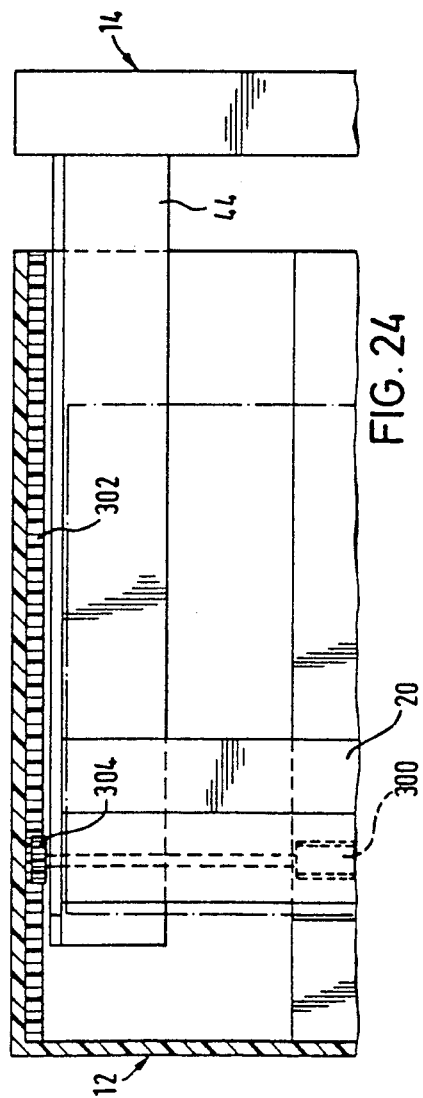

FIGS. 22 to 24 relate to another type of retaining means for the picture which is to be separated.

FIG. 22 shows in a schematicised longitudinal sectional view a device according to the invention, FIG. 23 is a partial transverse section corresponding to this Figure, and FIG. 24 shows a partial horizontal section.

While in a preferred example of execution the retaining means comprises a first clamping member in the form of a roller running with the separator bar, a second clamping member in the form of the retentive coating attached so that it is stationary on the first frame part (housing), and a spring arrangement in the form of the spring pressing the shoe against the retentive coating, in this case the clamping members are so constructed in operational reversal that the retentive coating is provided on the periphery of a roller 300 which by way of a toothed rack 302 and a pinion 304 connected to the roller is driven so as to rotate when the slider member 14 which forms the second frame part is withdrawn. The roller has a diameter equal to the effective circle of the pinion, so that it rolls on the individual sheet at a peripheral speed which is equal to the withdrawal speed of the slider member. The individual sheet is therein pressed against the floor 218 of the first frame part in the form of the housing 12 and is held firmly in the latter.

The device according to FIGS. 25 to 27 shows a further embodiment of the retaining means according to the invention. The individual sheet 188 arrives behind the separator bar 20 in the working gap between two rollers 300, 306, at least one of which is driven in the same manner as that described in FIGS. 22 to 24. The other roller may also be driven directly by the first, or driven along by means of friction. The pressing force is produced by the fact that one of the rollers, preferably the one which is not driven, is of resiliently compressible construction, and its shaft is placed somewhat nearer to the other roller than would actually correspond to the diameter. The cross-section through such a resilient roller is shown in FIG. 27, and it can be seen that blind recesses extend round the hub in a meandering arrangement so that there is always sufficient springiness available.

Figure 28:
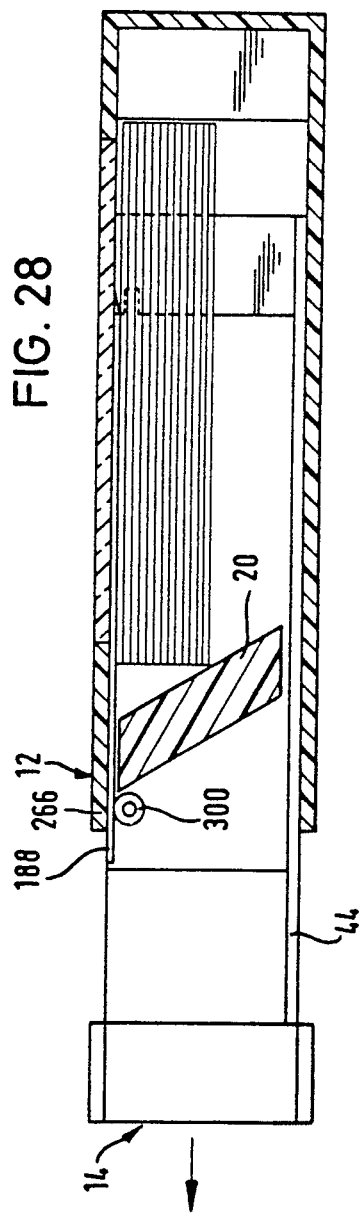

FIG. 28 shows a roller 300 which is rotatably mounted in the housing 12, forming the second frame part in this case, which roller is driven by way of a toothed rack (not shown), mounted in the side pieces 44 of the slider member, and a pinion (not shown) connected to the roller, the drive being at a peripheral speed which is equal to the withdrawal speed of the slider member. In this way, the separated picture 188 is apprehended behind the separator bar 20, pressed against the top wall 266 of the housing, along which it slides, and released in the outer end position of the slider member.

In the examples of execution described previously, the guide means was only marginally discussed with regard to its various aspects. But for photographic prints it also causes certain complications. Since in certain circumstances the separated sheet may be fairly severely bowed, it has proved to be expedient, or even unavoidable, to observe certain precautionary measures when designing the guide means. Thus the separated photograph must again be guided to the other end of the pile through a through gap of the separating means, even if this through gap is much less critical then the separating gap. In principle, all constructions which can be used for feeding may also be adapted for the return of the individual sheet. In general, however, it is sufficient to push the photograph out by its rear edge, it being also held firmly if required. Some embodiments are briefly described below.

With regard to the return through gap mentioned, care should be taken to ensure that the remainder of the pile does not block this through gap; this risk is present especially with piles of severely bowed photographic prints.

Figure 29:
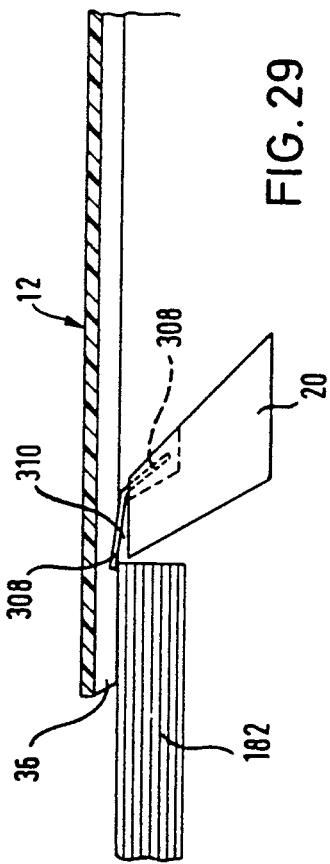

FIG. 29 shows in a schematicised longitudinal sectional view a type of construction which both holds down the remainder of the pile for the insertion of the separated sheet and also blocks the return gap during the start of the changeover cycle: In the separator bar 20 provided as separating means, a thin, resilient plate-like part 308 is arranged which engages, between holding-down members 36, on a top wall of the first frame part. The free end of the plate-like part at the same time presses on the sheet of the remainder of the pile 182 which faces towards it. The plate is supported in the second frame part so that it is displaceable for a short distance in the direction of movement of the frames, so that at the start of the next changeover cycle it can deflect towards the left (in FIG. 29), but at the same time still blocks the gap 310 so that the sheet returned last is pressed onto the remainder of the pile by the holding-down member before the plate-like part is moved in again.

FIG. 30 shows in a schematicised sectional view the preferred means: the spring 32 holds the rear edge of the sheet in front of the slider member stop member 52, the spring 80 supports the sheet approximately centrally, and behind the separator bar 20 the remainder of the pile 182 is held on a level according to the arrow 312, by the holding-down members 81 acting on it. The arrow 314 defines the level of that edge of the separator bar over which the individual sheet passes and which is in an inter-engaging engagement with the holding-down members.

Figure 31:
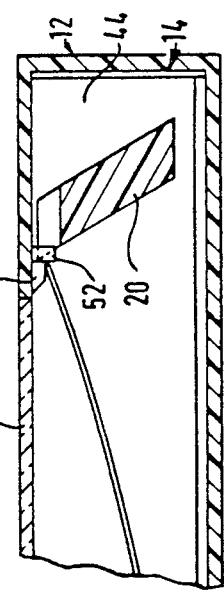

FIG. 31 shows in a schematic partial sectional side view a construction which serves to prevent a sheet also arriving incorrectly in the gap during the separating phase of the changeover cycle at the through gap for the return of the sheet. In this case, this requires the ribs 40, which engage (somewhat like the teeth of a comb) in recesses in the separator bar 20.

Figure 32:
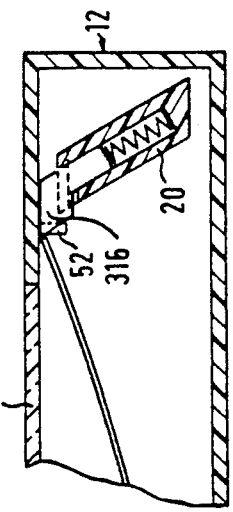

Alternatively, in FIG. 32 blocking members 316 moving out of the separator bar are shown which free the through gap (either by spring action as the result of running on an actuating means or by positive displacement) only when a sheet edge is present in the return phase (this may be thought of as a "non-return valve principle").

The following Figures relate to means to ensure the sheet returns itself. As mentioned, the individual sheet is preferably pushed through the gap with its rear edge resting against a stop member. When the sheet is bowed round a radius of curvature which is approximately perpendicular to the direction of movement, there is a risk that the sheet will not be pushed through the gap but will be squashed up and/or will slide away from the stop member.

In principle, therefore, in the case of the guide means such means are provided which hold the individual sheet as securely as possible in front of the "pushing" stop member, and/or means which compensate for or reduce any bowing of the photographs.

Figure 33:
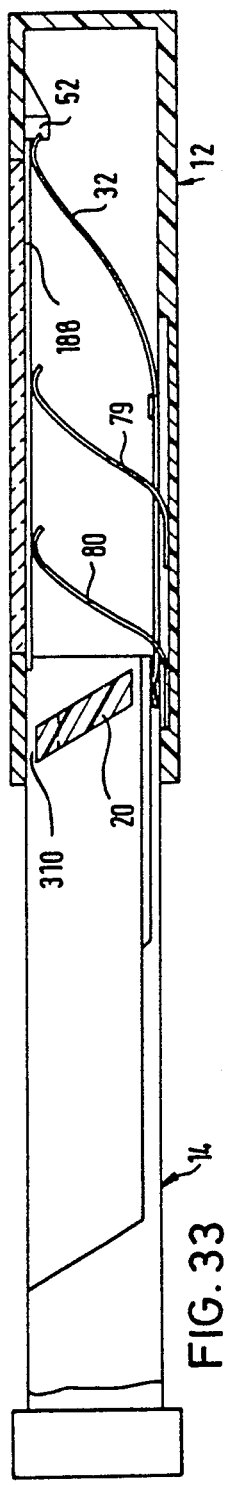

FIG. 33 shows these means just in principle in a schematicised longitudinal section: a first leaf spring 32 holds the individual sheet 188 in front of the "pushing" stop member 52, and further leaf springs 79, 80 press the sheet as flat as possible against the top wall of the housing 12 (first frame part), in order to present the leading edge of the individual sheet fairly accurately in front of the through gap 310. Reliability will be so much the greater, the longer the leaf springs engage with the individual sheet during the sheet return, before these springs are passed over by the separator bar 20 of the separating means. The side of the separator bar which faces towards the individual sheet 188 is preferably inclined in such a way that a leading edge of the individual sheet which is bowed downwards in front of it can "climb up" along the incline as a result of the camming effect of the latter. But if this sheet edge is forcibly presented to the return gap by other means, the corresponding surface of the separator bar may also be constructed to run perpendicular to the plane of the sheet.

Figure 34:
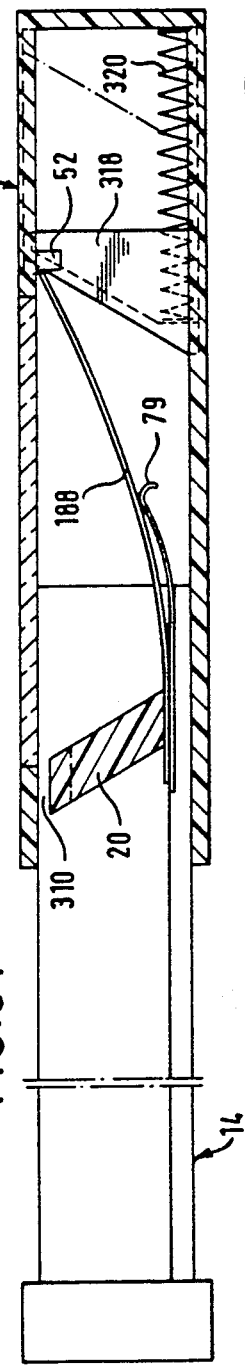
Figure 35:
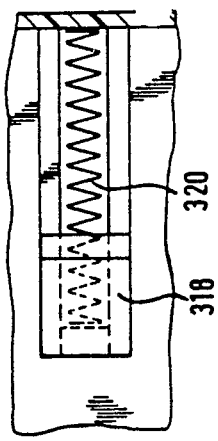
Figure 36:
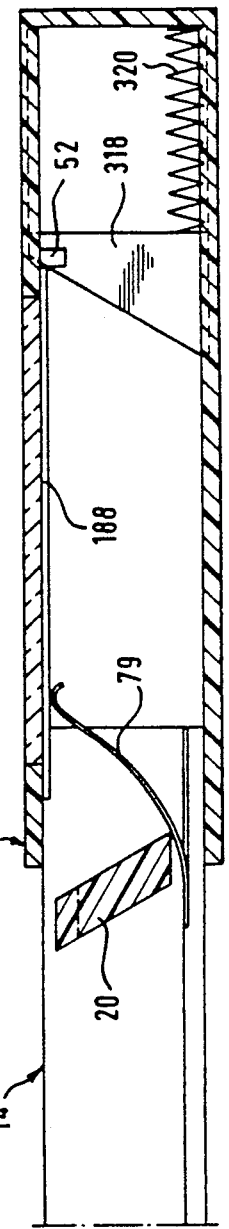

Instead of the leaf spring 32, other means may be used in order to displace the edge of the individual sheet remote from the separator bar against the other housing edge. This is shown in FIG. 34: a guide member 318 has been pushed by a spring 320 beneath this edge of the sheet 188 and has raised it up in front of the pushing stop member 52, still during the first half of the changeover cycle. The other sheet edge is then, after the separator bar 20 has passed, lifted up by a leaf spring 79 in front of the return gap 310. Towards the end of the second phase of the changeover cycle, the separator bar then pushes the guide member 318 back. Instead of the spring 320, the guide member 318 could also, by means of coupling to the second frame part, but with a "phase shift", be moved to and fro by the latter. Instead of the movable guide member, inclined wing-like guide members which are capable of being pivoted in and out could be provided, without any change in the operating principle. FIG. 35 shows schematically a plan view of the guide member 318, and FIG. 36 represents the situation at the point of reversal of the changeover cycle.

FIG. 37 shows a schematic side view of a mechanism which can be used instead of the lifting spring 79. A wire spring 324 is pivotable with its eye about a pin 322. One of its arms is angled and engages from outside transversely beneath the edge in question of the individual sheet, and the other arm can be moved over by engaging a stop member 326, carries the angled arm 328 along with it, and thus causes the edge of the sheet to be lifted. A limits-defining device 330 is indicated, in order to eliminate uncontrolled movements of the mechanism; the latter is indeed only to be switched over in the two end positions (rest position/point of reversal).

FIGS. 38 to 40 show an alternative form of the lever arrangement as guide means. The separator bar 20, shortly before its reversal position, meets a hook-like transporter 332 of a lever member carrier 334 to which two lever-like members 336 are linked by means of moulded-on pivots 338. By means of the displacement of the lever member carrier, the projections 340 formed on the underside of the lever-like members run onto actuating parts 342 of an actuator so that the lever-like members are raised up. During the return, the separator bar firstly meets the lever-like member nearest to it and presses the entire lever member carrier back for a short distance until the lever-like member is moved over; the other lever-like member, however, stays still, since the actuating parts 342 for the two lever-like members are at a greater distance from each other than the corresponding projections.

Figure 41:
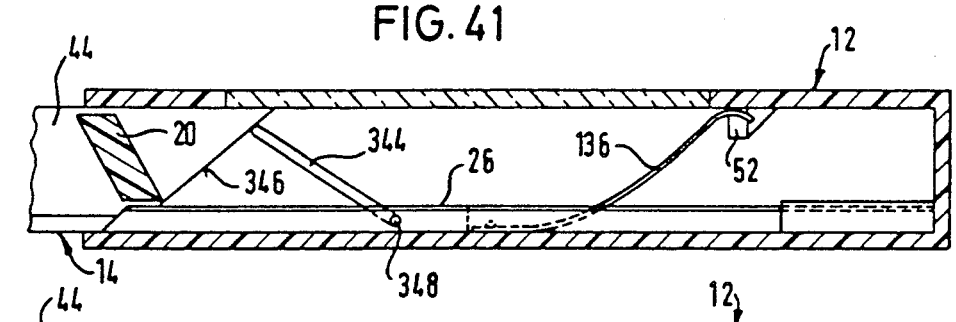
Figure 42:
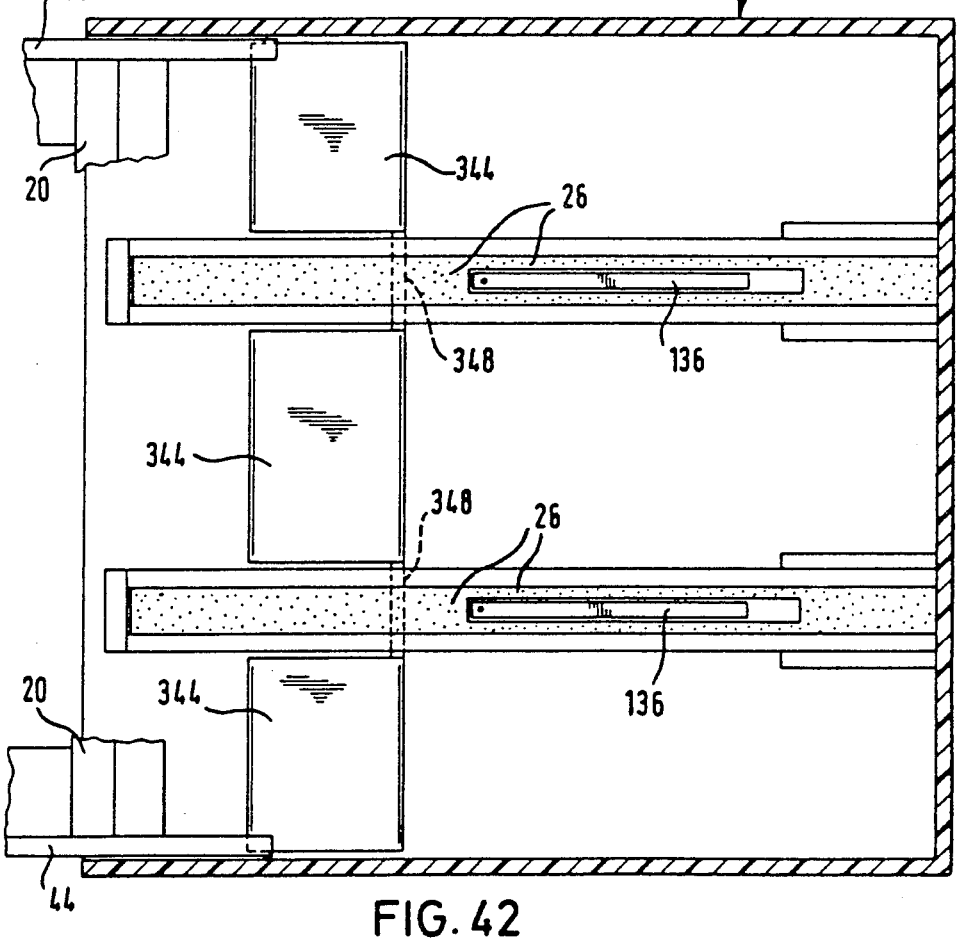

The embodiment according to FIGS. 41 and 42 represents an embodiment in which the retaining means for the individual picture comprises retentive coatings 26 in the first frame part. As a result of static charging, as mentioned above, the individual sheet may adhere so firmly to the retentive coatings that considerable forces are required to tear it away from them. It must however be guided onto the side of the frame part remote from the retentive coatings. The springs 136 are therefore provided centrally between two retentive coatings in each case. The edge of the individual sheet facing towards the separator bar 20 is lifted by a lever-like member 344 which is pressed down by means of actuator slopes 346 on the ends of the side pieces 44 of the slider member, while it is lifted up by a spring force (not illustrated). As can be seen from FIG. 42, the lever-like member extends over the entire width of the device, and in particular it also engages with the individual sheet directly adjacent to the retentive coatings. The shaft of the lever-like member is indicated by 348.

FIGS. 43 to 45 show another alternative form. On the separator bar 20, on both sides of the retentive coating 26, a thin plate-like member 350 is arranged so that it engages resiliently in a corresponding recess near the retentive coating. The two thin plate-like members are connected to each other by means of a bridge member 352. When the individual sheet runs through, each thin plate-like member is lifted up resiliently and snaps back into the recess after the rear edge of the sheet has passed, so that during the return travel the sheet edge in question is pulled away from the retentive coating and the edge has to climb up along the separator bar, since the return path through the other through gap is now securely blocked by means of the thin plate-like members.

Operational reliability can be considerably improved by ensuring that, at least in some relative positions of the frame parts, the user is not able to reverse the direction of movement, as at such places damage to the picture may occur, especially a compression thereof. Preference is therefore given to the provision, within the scope of the invention, of blocking means which, at least at the regions in question, prevent the direction of movement being reversed. In an extreme case, a free-wheel-type device may be provided, which allows a change in direction only in the end positions of the frame parts (that is to say, when they have been pushed fully together or pulled completely apart).

The system illustrated in FIGS. 46 and 47 is preferred, however.

In this example of execution, in which blocking takes place only in the "critical" phases of the changeover cycle, in a bearing eye 116 on the outer side of a side piece 44 of the slider member 14 in the region of the separator bar 20 there is pivotably arranged about a journal 160 extending at right angles to the longitudinal direction of the side piece 44 a control pawl 162 which is guided by a control projection 164 along channels which are defined by means of guide rails 166 formed on the bottom shell 62, so that the control projection 164 has to follow the path marked by arrows in FIG. 47 during insertion and withdrawal. During the greater part of the changeover cycle the direction of movement may be reversed without hindrance, but not when the control projection 164 is in the channel section 168 during insertion, or in the channel section 170 during the withdrawal. In the first case, if it should be desired to pull the slider member out again shortly before its inner end position, the control projection would run onto the stop member 172; in the latter case, if the slider member is pushed in again shortly before reaching the outer end position therefore, the control projection hits either the stop member 174 or the stop edge 176. It should be noted that the journal 160 fits in the bearing eye with a degree of friction such as to allow the control pawl to follow the guide bars without any noticeable hindrance, but not to be able to swing freely.

This free-wheel-type device may additionally be arranged mirror-symmetrically on the other side of the housing 12 between this and the slider member 14, both free-wheel devices then operating synchronously. If desired, a manual mechanism for disabling the free-wheel-type device(s) may be provided.

I claim:

1. Device for the cyclic rearrangement of a pile of rectangular or square sheets, especially a pile of photographic prints, with a first and a second frame part which may be moved relative to one another and parallel to the main plane of the pile, and with means which on movement of the frame parts backwards and forwards, remove an individual sheet at one end of the pile and add it to the other end of the pile again, these means comprising:
   (a) a separating means to separate the individual sheet from the pile,
   (b) a feeding means to feed sheets to the separating means,
   (c) retaining means to hold the individual sheet in the first frame part and the remainder of the pile in the other frame part, and
   (d) a guide means to guide the separated individual sheet for the purpose of returning it to the other end of the remainder of the pile, wherein as the feeding means there is provided a transporter (22, 404, 420) engaging the sheet to be separated at its rear edge in the direction of transport, whereas as the retaining means for the separated sheet there is provided at least one additional element (26/28, 32/80, 506/520, 300/306, 278, 32/288, 274).

2. Device according to claim 1, in which facing the pile there is a pressure arrangement (24) with a transporter (22) of hook-like construction.

3. Device according to claim 1, in which the retaining means (278/32/78) is of pincer-like construction.

4. Device according to claim 3, in which the retaining means (32, 278; 300/306) is controllable by the relative movement of the frame parts (12, 14).

5. Device according to claim 2, in which the transporter (22) is formed on the first frame part (12).

6. Device according to claim 3, in which the transporter (22) forms part of a device (24, 32) applying pressure to the pile.

7. A device according to claim 1, in which the separating means comprises a first (68) and a second (69) separating member which, resiliently (71) biassed towards each other, define a through-gap which for the entry of the sheet being separated has a spacing greater than the thickness of one sheet and less than the thickness of two sheets, and in which the spacing is, as appropriate, maintained during the outward movement of the frame parts or is reduced to the thickness of the sheet being separated.

8. A device according to claim 1, with guiding means (79) which convey the end of the individual sheet facing towards the separating means transversely to the direction of movement of the frame parts in front of a return through-gap.

9. A device according to claim 1, in which the retaining means for the individual sheet is a pincer-like arrangement (32/78; 278; 32/288; 266/290) which is arranged after the separating means (68, 69) in the feeding direction, and the retaining and release movements of which are controllable by the relative movement of the frame parts (12, 14).

10. Device according to claim 1, in which a rotation-preventing means is provided for the individual sheet (188) during the changeover cycle to secure it against rotation about an axis perpendicular to its principal plane independently of lateral limitations of its path of movement.

11. Device according to claim 1, in which the retaining means to retain the individual sheet comprises:
   (1) a roller (28, 300) which is arranged on the second frame part (14) and which rolls, on the individual sheet (188) which is to be held firm, at a peripheral speed which is equal to the relative speed between the two frame parts (12, 14), and
   (2) a support member on the side of the individual sheet remote from the roller which is either a complementary roller (306) arranged on the second frame part or a rail (134/26) complementary to the roller provided on the first frame part, and
wherein the roller and complementary element hold the individual picture by means of a pressure arrangement.

12. Device according to claim 1, in which the first frame part has a viewing window (35).

13. Device according to claim 1, in which the two frame parts are coupled by way of a free-wheel-type device which at least over some regions of the movement of the frame parts blocks this when there is a change in the direction of movement.

14. Device according to claim 12 with means (93, 38) which are provided on the frame part (14) that is movable relative to the window, and which hold the sheet facing towards the window (35) spaced from the latter at least during movement of the sheet relative to the window, by engaging with the edges of the sheet which run transverse to the direction of movement.

15. Device according to claim 1, in which the transporter (22) is arranged on a first spring arm (24) which presses against the pile, and the additional element is a clamp formed from a second spring arm (32) which cooperates with a clamping face provided on the first frame part (12).

16. Device according to claim 15, in which the two spring arms form a one-piece component.

17. Device according to claim 15, in which the spring arms are brought into and out of engagement with the individual sheet by the movement of the frame parts.

18. Device according to claim 15, in which the spring arms form a pressing system when the frame parts are pushed together which presses the pile against a viewing window provided in the first frame part (12).

19. Device according to claim 1 for containers for a pile of substantially rectangular pictures of like format, with a housing having a viewing window and a slider member that accommodates the pictures and may be pulled out of the housing, and with a support which is hinged on the housing floor opposite the window and has stop members which, when the support is outwardly folded by striking against complementary stop members of the housing, lock the support, wherein the stop members formed on the support project into the inside of the housing and the complementary stop members project from the housing floor right through the support with their outer ends flush with the surface of the support when the latter is folded against the housing.

20. Device according to claim 1 for the cyclic rearrangement of a pile of sheets (182) with a housing (12) having a viewing window (35) and a slider member (14) which may be withdrawn from the housing and reintroduced parallel to the viewing window, and with a sheet-changing mechanism by means of which one sheet of the pile (182) is held back whilst the slider member (14) conveys the remainder of the pile out of the housing (12), wherein means are provided to remove the sheet left behind in the housing (12) through the housing opening provided for the slider member (14).

* * * * *